Dec. 15, 1925.

S. S. SWANSON 1,565,601

FEEDING MECHANISM FOR SPREADERS

Filed May 5, 1924

Inventor:
Stanley S. Swanson

Patented Dec. 15, 1925.

1,565,601

UNITED STATES PATENT OFFICE.

STARLEY S. SWANSON, OF STOUGHTON, WISCONSIN, ASSIGNOR BY MESNE ASSIGNMENTS, TO MOLINE IMPLEMENT COMPANY, A CORPORATION OF ILLINOIS.

FEEDING MECHANISM FOR SPREADERS.

Application filed May 5, 1924. Serial No. 71,099.

*To all whom it may concern:*

Be it known that I, STARLEY S. SWANSON, a citizen of the United States, residing at Stoughton, Wisconsin, have invented certain new and useful Improvements in Feeding Mechanism for Spreaders, of which the following is a specification.

The invention relates to a feeding mechanism for spreaders.

The general object of the invention is to provide an improved and simplified driving mechanism for the conveyer or feeding apron of a spreader.

Other objects and advantages of the invention will appear from the specification and drawings.

An embodiment of the invention is illustrated in the drawings in which—

Figure 1:
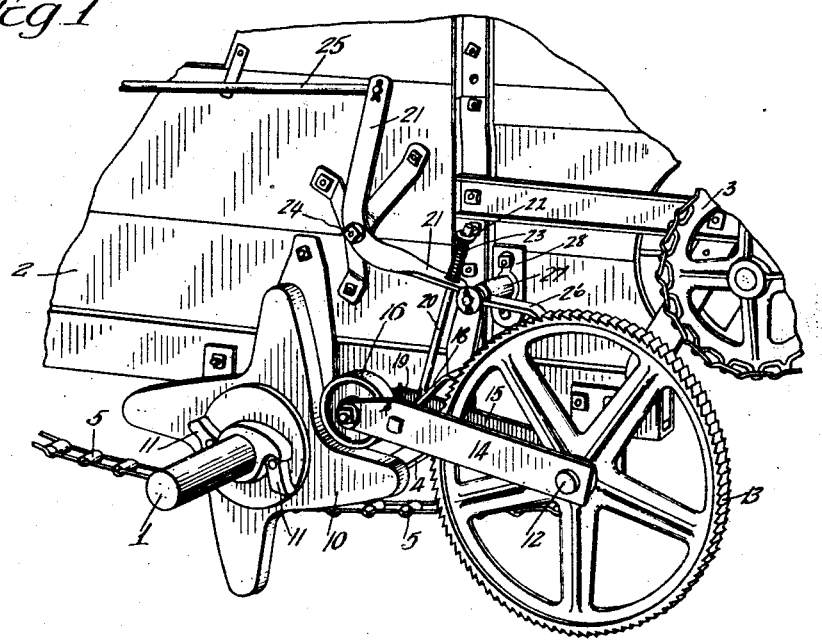
Figure 1 is a perspective view of the driving mechanism in working position.

The spreader with which the mechanism is illustrated has a rear axle 1 and a spreader box 2. The spreader is of the usual type having a spreading cylinder at its rear driven by a sprocket wheel 3 and a conveying mechanism or apron comprising a plurality of slats 4 attached to chains 5. The apron runs over and under the bottom of the spreader box and serves to move its contents slowly toward the spreading cylinder so as to feed the material to the cylinder at the proper rate.

The mechanism for driving the feeding or conveying mechanism must operate more slowly than the other portions of the spreader. It must be susceptible of adjustment so that the rate of feed may be varied. It must be constructed so that adjustment can be made while the spreader is in operation and it must be simple, rugged, and durable to meet the difficult conditions of practical use.

The mechanism is driven from the rear axle of the spreader by a cam 10 journalled loosely on the axle. The cam carries two pawls 11 that co-operate with an internal ratchet on a hub on one of the rear wheels of the spreader. These pawls are positioned so that, when the spreader is moving forward, the cam 10 is rotated but, when the spreader is backed, the cam will not be rotated. Instead the pawls 11 will travel loosely over the ratchet on the spreader wheel.

The apron 4—5 is driven by sprockets fixed to a counter shaft 12 carried by the spreader box 2. The counter shaft is rotated by a ratchet wheel 13 which is intermittently moved by a pawl arm operated by the cam 10. The pawl has two side members 14 and 15 pivoted to the counter-shaft 12, the member 14 being on one side of the ratchet wheel 13 and the member 15 on the other. This arm extends toward the cam 10 and a roller 16 is journalled on the outer end of it, the arm being positioned so that the cam contacts the roller to move the arm.

Pivoted between the ends of the arm and on an axis 17 is a pawl 18 which is normally biased into engagement with the ratchet wheel by a coil spring 19.

Pivoted to the arm 14—15 is a link 20 which extends loosely through an opening in one of the arms of a bell crank lever 21. The end of the link carries a stop 22 and positioned between this stop and the arm of the bell crank lever is a coil spring 23. The bell crank lever is pivoted at the point 24 to the spreader body and its other arm is connected to a controlling or operating rod 25 extending to the forward end of the spreader for manipulation by an operator.

The ratchet wheel 13 is prevented from rotating in the wrong direction by a pawl 26 pivoted on a small shaft 27 carried by the bracket 28 on the spreader body.

The operation of the mechanism may be briefly described as follows:

Assuming that the spreader moves forward with the parts in the position illustrated in Figure 1, the cam 10 will rotate in a counter-clockwise direction and one of its projections will contact the roller 16, thereby raising the arm 14—15. Since the pawl 18 is in contact with the ratchet wheel the ratchet wheel will be moved a short distance. During this movement the link 20 will move upwardly through the opening in the end of the arm of the bell crank lever and stop 22 will move out of contact with spring 23.

After the projection on the cam 10 has passed under the roller 16, the weight of the arm and associated parts will bring it back to its original position. As it moves back, the pawl 18 rides over the teeth of the ratchet wheel to take up a new position. As the arm falls back to its original position the stop 22 contacts spring 23 and the spring acts to cushion the fall of the arm.

As the spreader moves forward, the next projection on the cam 10 raises the pawl arm as before and moves the ratchet wheel another short distance. This operation is repeated, the ratchet wheel being notched around to drive the conveying mechanism at a relatively low rate of speed.

The rate of feed is regulated by varying the position of the bell crank lever 21 by means of the control rod 25. It will be clear that if the bell crank lever is positioned so as to normally hold the arm 14—15 in a higher position than that illustrated in Figure 1, the projections on the cam will not move the arm through as great an arc as when the parts are in the position of Figure 1. By properly positioning the bell crank lever, the arm 14—15 can be made to move the ratchet wheel a distance corresponding to 1, 2, 3, 4 or more teeth in the periphery of the ratchet wheel.

Figure 2:
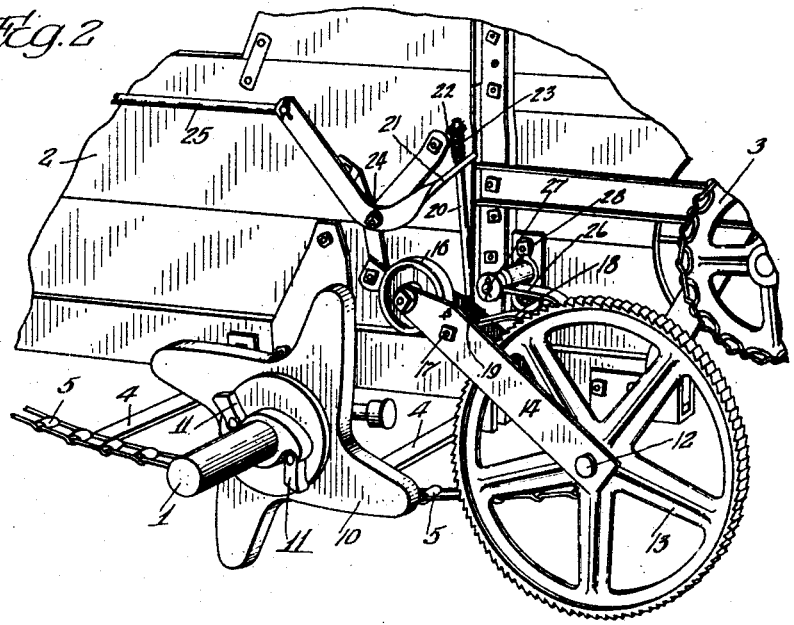
Figure 2 is a perspective view of the driving mechanism in disconnected position.

The bell crank lever may also be used to move the arm 14—15 so as to disconnect the driving mechanism. The disconnected position of the parts is shown in Figure 2. In this position the arm is held so that the roller 16 is not contacted by the cam 10.

The connection between the link 20 and the bell crank lever 21 permits the feed to be regulated while the spreader is in operation. If the connection were a rigid one, and an attempt were made to raise the cam by means of the control rod while the pawl 18 was in a notch of ratchet wheel 13 sufficient power would have to be applied to the control rod to move the entire feeding mechanism. As the parts are constructed, a movement of the bell crank lever 21 in a counter-clockwise direction merely compresses the spring 23 and has no effect on the throw of the pawl arm that is taking place while the adjustment is being made. However, the adjustment becomes effective as the arm 14—15 drops back to its position for the next stroke. Instead of dropping back as far as formerly, assuming that a stroke is to be shortened, it will stop short of its former position and the next stroke will be a shorter one.

Furthermore, the loose connection between the pawl arm and its adjusting means prevents the movements of the pawl arm from damaging the adjusting means in any way.

All the parts are made rugged and durable, each is simple and need not be machined with precision, the assembly is not difficult, and there are no parts to get out of adjustment.

It is to be understood that the structure shown is for purposes of illustration only and that variations may be made in it without departing from the spirit and scope of the invention as defined by the claims.

I claim:

1. In a spreader, a drive shaft, a cam carried thereby, a ratchet wheel for driving a feeding mechanism, an arm having a roller for engaging the cam, a pawl carried by the arm for engaging the ratchet wheel, a link connected to the arm for varying the amplitude of movement of the arm, a bell crank lever one arm of which is connected to a controlling means and the other arm of which is arranged to loosely receive the link, and a spring between the bell crank lever and the end of the link.

2. In a spreader, a drive shaft, a cam carried by the shaft, a counter-shaft, a ratchet wheel on the counter-shaft, an arm pivoted to the counter-shaft carrying a roller on its end co-operating with the cam on the drive shaft, a pawl carried by the arm between the mounting of the roller and the pivotal mounting of the arm, a spring for normally biasing said pawl into engagement with the ratchet wheel, a bell crank lever, a link pivoted to the arm and extending loosely through the end of one arm of the bell crank lever, a stop on the end of the link, a spring between the stop and the bell crank lever arm, and a controlling means for the bell crank lever to vary its position.

3. In a spreader, a drive shaft, a cam carried by said shaft, a counter-shaft, a ratchet wheel on the countershaft, a pawl arm pivoted to the counter-shaft, said arm comprising two members one on each side of the ratchet wheel, a roller journalled between the side members of the arm at their ends to co-operate with the cam on the driving shaft, a pawl pivoted between the side members of the arms on an axis between the axis of the roller and the pivotal axis of the arm, a coil spring for normally biasing said pawl into engagement with the ratchet wheel, a bell crank lever, a link pivoted to the arm and extending loosely through one arm of the bell crank lever, a stop carried by the end of the link, a coil spring between the stop and the bell crank lever arm, and an operating means for the bell crank lever.

4. In a spreader, a drive shaft, a cam carried by the shaft, a ratchet wheel pivoted on an axis removed from the axis of the drive shaft, an arm pivoted at one end on the same axis as the ratchet wheel and extending toward the cam, a roller on the end of the arm for cooperating with the cam, a pawl pivoted to the arm intermediate its ends, a spring for normally biasing the pawl into engagement with the ratchet wheel, a bell crank lever, a link pivoted to the arm and extending loosely through one arm of the bell crank lever, a resilient connection between the arm of the bell crank lever and the link, and means for controlling the bell crank lever.

In testimony whereof, I affix my signature.

STARLEY S. SWANSON.